United States Patent [19]
Wolbers et al.

[11] Patent Number: 5,150,778
[45] Date of Patent: Sep. 29, 1992

[54] SELF-ALIGNING CLUTCH RELEASE BEARING ASSEMBLY

[75] Inventors: Eugene A. Wolbers, Northville; Douglas A. Drewes, West Bloomfield, both of Mich.

[73] Assignee: Federal-Mogul Corporation, Southfield, Mich.

[21] Appl. No.: 708,539

[22] Filed: May 31, 1991

[51] Int. Cl.$^5$ .............................................. F16D 23/14
[52] U.S. Cl. ................................. 192/98; 192/110 B
[58] Field of Search ........................... 192/98, 110 B

[56] References Cited

U.S. PATENT DOCUMENTS

| | | | |
|---|---|---|---|
| 3,333,664 | 8/1967 | Chapaitis | 192/98 |
| 3,741,361 | 6/1973 | Brandenstein | 192/110 B |
| 4,080,019 | 3/1978 | Flaisser et al. | 192/98 X |
| 4,276,974 | 7/1981 | Ladin | 192/98 |
| 4,351,427 | 9/1982 | Miyahara | 192/98 |
| 4,374,556 | 2/1983 | Olschewski et al. | 192/110 B X |
| 4,724,943 | 2/1988 | Harrington et al. | 192/98 |
| 4,808,015 | 2/1989 | Babcock | 192/98 |
| 4,854,437 | 8/1989 | Harrington | 192/98 |
| 4,881,629 | 11/1989 | Gay et al. | 192/98 |
| 4,926,993 | 5/1990 | Kusumoto et al. | 192/98 |
| 4,951,796 | 8/1990 | Harrington et al. | 192/98 |
| 4,997,075 | 3/1991 | Nakamura et al. | 192/98 |

Primary Examiner—Leslie A. Braun
Assistant Examiner—Nicholas Whitelaw
Attorney, Agent, or Firm—Lawrence J. Shurupoff

[57] ABSTRACT

A self-aligning clutch release apparatus includes an axially slidable carrier sleeve, a thrust plate floatably carried on the sleeve, and an anti-friction bearing shiftably supported on the sleeve independently of the thrust plate. The thrust plate can reorient itself in accordance with forces imposed by a clutch actuating yoke. The anti-friction bearing can shift relative to the carrier sleeve so as to be in a centered position relative to an array of clutch release levers.

19 Claims, 2 Drawing Sheets

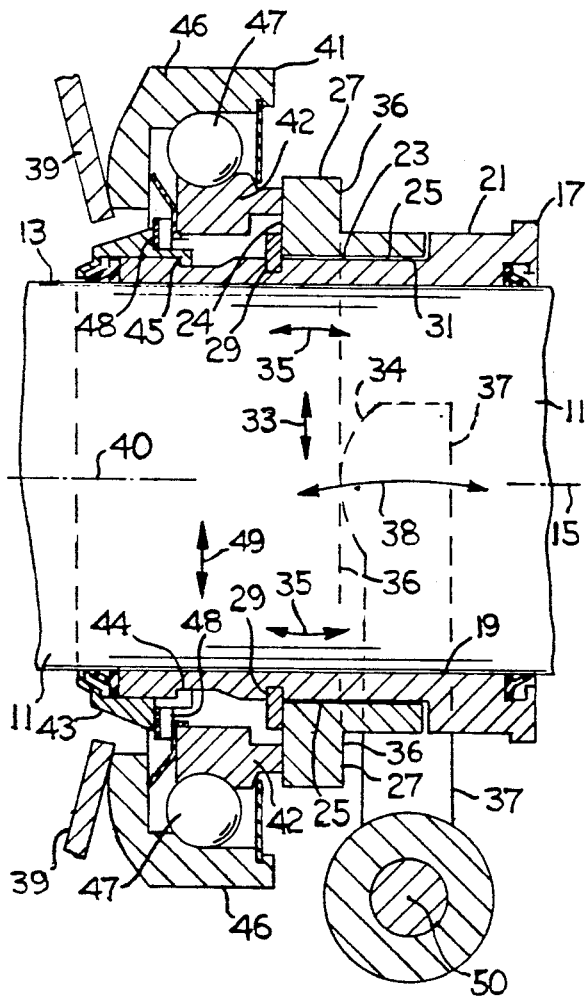
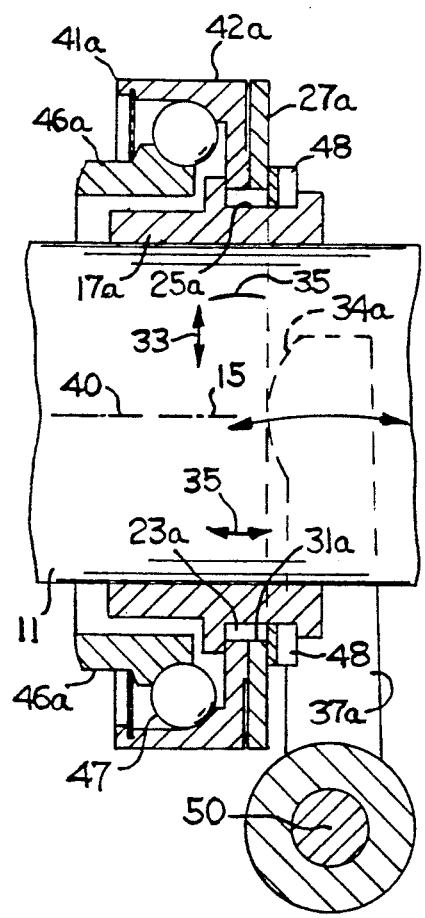
FIG. 1
FIG. 2

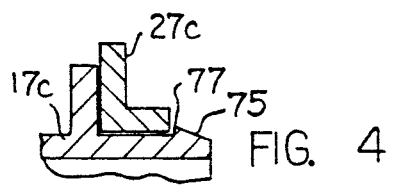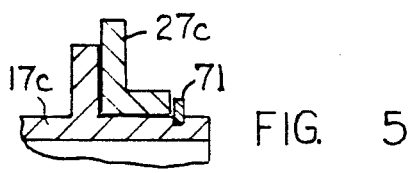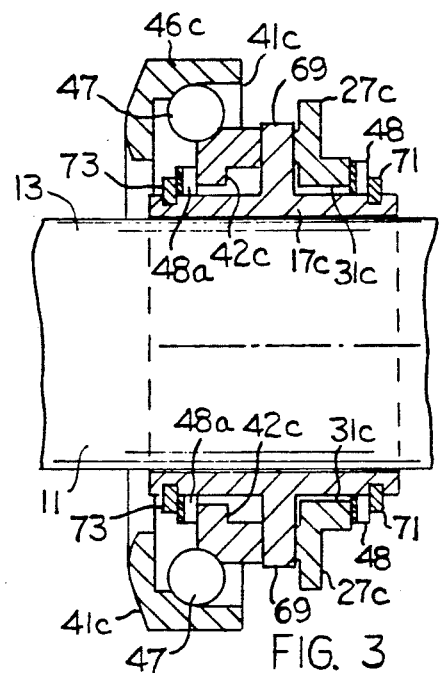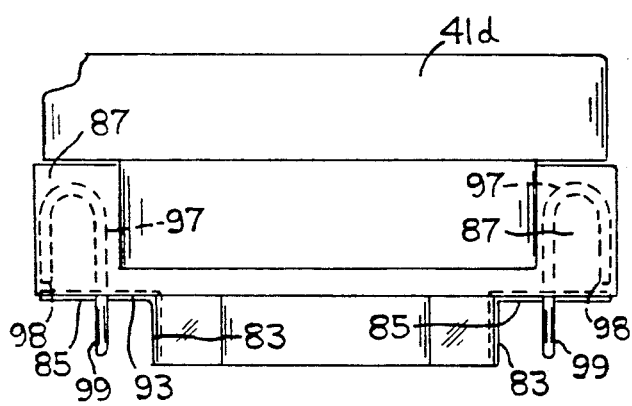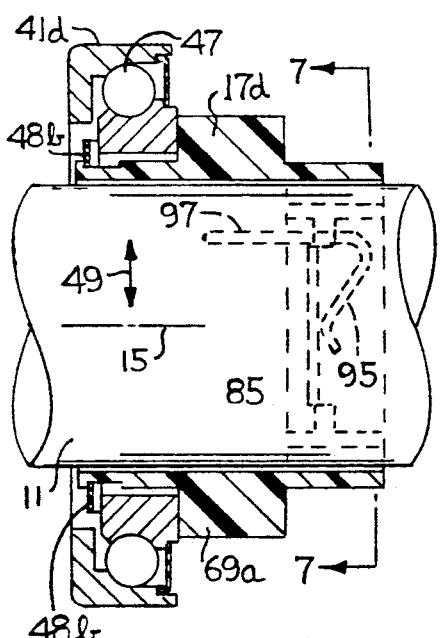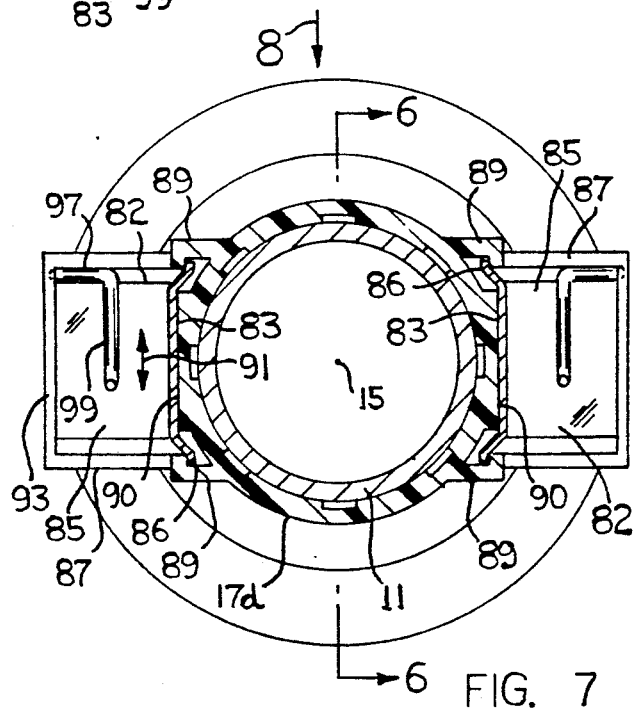

SELF-ALIGNING CLUTCH RELEASE BEARING ASSEMBLY

BACKGROUND OF THE INVENTION

1. Field of the Invention

This invention relates to clutch mechanisms used in manually-controlled automotive transmissions for transmitting power from the engine to the road wheels.

2. Description of Prior Developments

An example of a self-aligning clutch release drive connection is shown in U.S. Pat. No. 4,276,974 to Ladin which discloses a carrier sleeve slidably mounted on a fixed tubular shaft for supporting an anti-friction bearing. A non-rotating race of the anti-friction bearing is adapted to engage an actuating fork operated by a clutch pedal while a rotating race engages an array of radially extending clutch release levers. When the clutch pedal is depressed, the actuating fork exerts an operating force on the non-rotating race which transmits the force via the rotating race to the inner ends of the clutch release levers thereby swinging the levers in unison so as to disengage the clutch.

Because the clutch actuating fork typically pivots through an arc, a radial component of force may be transmitted to the carrier sleeve. This can cause increased resistance to clutch pedal actuation and can increase the wear rate of the bearing carrier sleeve and tubular shaft upon which the carrier reciprocates. In extreme cases, excessive wear and friction between the sleeve and shaft can generate such high actuation loads that the clutch release system can fail.

In order to achieve a smooth, noiseless, wear-free clutch disengagement action, the clutch disengagement levers should be operated in unison and radial loading between the carrier sleeve and its mounting shaft should be minimized. This requires that the rotating bearing race exert substantially the same operating force on each declutching lever and that radial loads from the pivoting actuating fork be reduced or eliminated. In some cases this may be difficult to achieve, due to manufacturing variances and frictional interferences between the support shaft, non-rotary race and actuating fork.

A typical approach to partially solving the above-noted problems is to allow the clutch release bearing to coaxially align itself with the clutch disengagement levers. An example of such a bearing is shown in U.S. Pat. No. 4,276,974 which includes a mechanism for supporting a non-rotating bearing race on a carrier sleeve so that the rotating race can have its end face in simultaneous engagement with all of the declutching levers in spite of oblique forces imposed on the anti-friction bearing by an actuating yoke and slidable sleeve. The support mechanism includes an annular wave spring mounted between the carrier sleeve and the non-rotating race member of the anti-friction bearing.

A different approach to solving clutch release bearing alignment problems is shown in U.S. Pat. No. 4,997,075 which provides a shiftable annular guide plate for movably engaging the clutch operating fork. The guide plate is mounted on rollers which allow the guide plate to move perpendicular to the axis of the clutch release bearing during clutch actuation.

SUMMARY OF THE INVENTION

The present invention includes at least one thrust plate which is movably and slidably supported on a carrier sleeve at a position between an actuating fork and a non-rotating bearing race and which is shiftable in a radial plane. The thrust plate provides an articulated connection between the actuating fork and the non-rotating race, thereby minimizing excessive radial forces that would otherwise be transferred to and imposed on the non-rotating race and carrier sleeve by the actuating fork. Such distortional forces would otherwise have an adverse frictional effect on the declutching action and would promote excessive wear on the carrier sleeve, thrust plate, and non-rotating race.

THE DRAWINGS

FIG. 1 is a sectional view taken through a clutch release drive connection embodying features of this invention.

FIG. 2 is a sectional view through another embodiment of the invention.

FIG. 3 is a sectional view taken through a third embodiment of the invention.

FIGS. 4 and 5 are fragmental views of variations of the thrust plate mounting assembly of FIG. 3.

FIG. 6 is a sectional view through another embodiment of the invention. FIG. 6 is taken on line 6—6 in FIG. 7.

FIG. 7 is a sectional view taken on line 7—7 in FIG. 6.

FIG. 8 is a side view of the device shown in FIGS. 6 and 7 taken in the direction of arrow 8 in FIG. 7.

DETAILED DESCRIPTION OF THE PREFERRED EMBODIMENTS

FIG. 1 illustrates a clutch release actuating mechanism that includes a stationary tubular shaft or quill 11 having a cylindrical outer surface 13, and a shaft axis designated by numeral 15. Slidably arranged on shaft 11 is a carrier sleeve 17 having a cylindrical inner surface 19 and a cylindrical outer surface 21. A peripheral groove 23 is formed in shaft surface 21 to form a groove surface 25.

A thrust plate 27 is mounted to or supported by sleeve 17 in axial and radial alignment with groove 23. Thrust plate 27 may be formed as an annular or tubular member, a C-shaped member, or U-shaped member or the like. A snap ring 29 is affixed to the sleeve to limit axial motion of the thrust plate to a relatively small amount, e.g. 0.02 inch The inner arcuate surface 31 of the thrust plate has a diameter that is slightly greater than the diameter of groove surface 25 thereby allowing the thrust plate to move radially relative to the carrier sleeve as denoted by arrow 33 and thereby provide for self-alignment. The thrust plate can also wobble or tilt slightly around shaft axis 15, as denoted by numeral 35. This tilting provides additional self-alignment as discussed below.

Plate 27 has a radial surface 36 engaged with a clutch actuator such as actuating yoke 37. Typically, the yoke includes a flanged element having a U-shaped opening allowing arm portions of the yoke to extend upwardly along both sides of carrier sleeve 17. The yoke is swingably supported for arcuate motion around pivot axis 50, as indicated by arrow 38.

Face areas 34 of the yoke may be slightly curved for effecting a rolling contact on surface 36 of the thrust plate 27. Yoke 37 is connected to a clutch pedal in a known fashion so that depression of the pedal produces a leftward swinging motion of yoke 37. The thrust plate 27 and carrier sleeve 17 are thus moved bodily to the left to disengage a clutch.

The clutch includes an array of clutch release levers, two of which are designated by numeral 39 in FIG. 1. In a typical situation, twelve or more radially oriented levers can be used. The inner ends of the levers are substantially equidistant from the clutch axis, designated by numeral 40. Nominally, the clutch axis 40 will be coincident with axis 15 of shaft 11. However, manufacturing tolerances will often cause the clutch axis to be slightly offset from the shaft axis or obliquely angled relative to the shaft axis. U.S. Pat. No. 3,333,664 to Chapaitis shows in somewhat greater detail the overall arrangement of the clutch release levers and the tubular support shaft for the clutch release drive connection.

An anti-friction bearing assembly 41 is slidably mounted on carrier sleeve 17 between thrust plate 27 and clutch release levers 39. The anti-friction bearing assembly includes a non-rotating race member 42, a rotating race member 46, and anti-friction balls 47 interposed between the two race members. When the clutch is in its engaged condition the levers 39 rotate around clutch axis 40 thereby driving race member 46 around the bearing axis which is preferably coincident with axis 40.

Anti-friction bearing assembly 41 is retained on carrier sleeve 17 by an annular seal and retention member 43 that is telescoped onto the left end of the carrier sleeve. A series of spring hooks 45 extend rightwardly from member 43 for snap-fit engagement over a shoulder 44 on the sleeve, such that member 43 forms a rigid operating part of the carrier sleeve.

An annular wave spring 48 is interposed between member 43 and race member 42 to exert a rightward bias on the anti-friction bearing assembly. The bearing assembly is axially and radially slidable or movable on the carrier sleeve. Such movement can be attributed to the bearing assembly being floatably and frictionally retained on carrier sleeve 17 by seal retention member 43 and an axially yielding wave spring 48 so that the bearing assembly and the thrust plate may each slide radially with respect to the carrier sleeve and one another.

Wave spring 48 prevents the anti-friction bearing assembly from uncontrolled rattling or shifting relative to the carrier sleeve. However, the axial force generated by the wave spring on race member 42 is not so great as to rigidly retain the race member 42 in any particular fixed position. The wave spring exerts sufficient axial force on race member 42 so as to continually bias the race member against radial surface 24 of thrust plate 27.

The clutch release levers 39 exert centering forces on the annular end surface of rotating race member 46. The anti-friction bearing assembly can respond to the centering pressure of levers 39 by shifting radially, as denoted by numeral 49. The anti-friction bearing assembly can also undergo a tilting or wobbling motion to align the bearing axis with clutch axis 40, so that during a declutching process race member 46 exerts approximately the same leftward force on all of the levers 39.

The anti-friction bearing assembly 41 is biased rightwardly by levers 39. The thrust plate 27 exerts a leftward biasing force on the anti-friction bearing assembly. The inner surface of race member 42 is spaced radially outwardly from carrier sleeve 17 so that the anti-friction bearing assembly can radially move so as to take a position for effectively transmitting a balanced and equalized actuating force from thrust plate 27 to levers 39 without any binding interference between the carrier sleeve and race member 42.

Thrust plate 27 is axially and radially shiftable or movable independently of race member 42 and vice versa. The position or attitude of plate 27 is determined primarily by yoke 37, especially the movement directions of yoke face areas 34 of the yoke. By compressing wave spring 48, plate 27 can rock in the plane of the paper (FIG. 1) around its engagement points with yoke face areas 34 or move axially. Plate 27 can also slide radially as indicated by arrow 33. However, the engagement pressure of yoke face areas 34 on radial surface 36 otherwise constrains the thrust plate within the plane of the paper (FIG. 1).

A principal feature of the invention is the axially and radially movably-mounted thrust plate 27 which is adapted for transmitting an actuating force from yoke 37 to the anti-friction bearing assembly 41. This force is transmitted while allowing the carrier sleeve 17 to maintain a substantially coaxially centered position relative to the shaft axis 15. Race member 42 can take an oblique or offset position relative to thrust plate 27 because of the absence of any rigid or fixed connections between these two members.

The radial clearance between sleeve 17 and thrust plate 27 reduces the radial forces transmitted by the yoke to the shaft 11 via the carrier sleeve and thereby enables the sleeve to move relatively smoothly on shaft 11 without binding or excessive sleeve wear. That is, instead of resisting the radially directed forces from yoke 37, the thrust plate 27 simply moves or slides radially with the yoke over the radial clearance space around sleeve 17.

FIG. 1 illustrates a preferred embodiment of the invention. Additional embodiments of the invention are shown in FIGS. 2 through 8. FIG. 2 shows an actuating yoke 37a swingable around a swing axis 50. Face areas 34a of yoke 37a transmit the actuating force from yoke 37a to thrust plate 27a. The thrust plate has an inner cylindrical edge 31a having a diameter that is greater than the outer diameter of groove surface 25a on carrier sleeve 17a. Thrust plate 27a can thus shift radially, as indicated by arrows 33. The thrust plate can also rock or wobble, as indicated by arrows 35.

In FIG. 2, a wave spring 48 is seated within groove 23a to bias the thrust plate against the non-rotating race member 42a. The rotating race member 46a is adapted to engage the clutch release levers for centering the bearing relative to the clutch axis. The anti-friction bearing assembly and thrust plate are independently suspended on the carrier sleeve 17a so that the anti-friction bearing assembly can conform to and align itself with the clutch release levers while the thrust plate shifts its position in accordance with the force input from yoke 37a. The carrier sleeve 17a can thus move smoothly along support shaft 11, without binding or excessive wear previously caused by the transmission of excessive radial forces from the bearing assembly and thrust plate to the carrier sleeve and shaft.

FIG. 3 shows another embodiment of the invention, wherein carrier sleeve 17c has an outwardly radiating wall 69 interposed between thrust plate 27c and the anti-friction bearing assembly 41c. A snap ring 71 is spaced rightwardly from flange 69 to form an annular space for thrust plate 27c and wave spring 48.

The inner surface 31c of the thrust plate is spaced radially outwardly from the outer side surface of carrier sleeve 17c, such that the thrust plate is radially floatable with respect to the carrier sleeve. The thrust plate can shift radially and/or rock relative to the carrier sleeve. Wave spring 48 prevents the thrust plate from rattling. The actuating yoke (not shown) could be similar to the yoke shown in FIG. 1.

Anti-friction bearing assembly 41c includes a non-rotating race member 42c, a rotating race member 46c and a complement of anti-friction balls 47. The bearing assembly is floatably retained on sleeve 17c by a second snap ring 73. A second wave spring 48a is trained between snap ring 73 and the left end surface of race member 42c to resiliently bias the anti-friction bearing assembly against carrier sleeve flange 69.

During a clutch disengagement process the actuating yoke exerts a leftward biasing force on thrust plate 27c. The thrust plate exerts an operating force on wall 69 to move sleeve 17c leftwardly. The floatable disposition of thrust plate 27c minimizes any tendency of sleeve 17c to bind on shaft 11. Sleeve flange 69 transmits an operating force to race member 42c. The floatable or self-aligning disposition of the anti-friction bearing assembly on sleeve 17c enables the bearing assembly to have a centered orientation relative to the clutch release levers.

As alternatives to the arrangement of FIG. 3, FIGS. 4 and 5 depict other arrangements for mounting thrust plate 27c to sleeve 17c. In FIGS. 4 and 5, wave spring 48 has been eliminated so that thrust plate 27c can freely move both axially and radially about sleeve 17c without any biasing force other than that applied by the actuating yoke.

In FIG. 4, a ramp surface 75 is formed on the end of sleeve 17c so that thrust plate 27c may be axially forced and snapped over surface 75. Thrust plate 27c is then axially retained on sleeve 17 by radial wall 77. The embodiment of FIG. 5 provides for an annular retainer clip 71 as in FIG. 3, but eliminates the use of wave spring 48.

FIGS. 6 through 8 illustrate another arrangement wherein carrier sleeve 17d is slidably mounted on shaft 11 to provide a support for an anti-friction bearing 41d that is constructed generally similarly to bearing 41c of FIG. 3. A wave spring 48b is located within an annular groove in sleeve 17d for resiliently urging the antifriction bearing 41d against wall portion 69a of the carrier sleeve. The bearing 41d can shift radially, as denoted by arrow 49.

A thrust plate system is self-adjustably mounted on sleeve 17d, whereby the sleeve can move freely on shaft 11 without binding or wearing prematurely. The thrust plate system includes two separate L-shaped metal thrust plates 82 spaced laterally apart in opposite directions from the sleeve axis 15. Each plate 82 includes a plate portion 83 extending axially parallel to sleeve axis 15 and a transverse radially-extending plate portion 85 seating against a flat radial surface formed on a planar sleeve extension 87.

Edge areas 86 of each plate portion 83 fit loosely within axially extending guide slots 89, such that the L-shaped plate is retained against a flat axially-extending face 90 of the sleeve while still being free for limited radial or tangential movement in the direction of arrow 91 (FIG. 7). Each sleeve extension 87 is recessed to form a rim 93 around edge areas of the associated plate portion 85. Each plate portion 85 has an exposed flat face adapted to be engaged with one arm of an associated clutch release arm or yoke for moving carrier sleeve 17d in a right-to-left direction (FIG. 6). The yoke extends into and is clipped or retained within the spaces 84 between plate portions 85 and spring wire plate retaining clips 95.

Each wire clip includes a U-shaped mounting portion 97 extending into a narrow pocket in the associated sleeve extension 87. When the clip mounting portion is moved into the pocket its free end 98 snaps behind a shoulder formed at the mouth of the pocket, thereby retaining the clip in its installed position. The exposed portion 99 of the clip extends around the free end portion of the actuating yoke.

The arrangement of FIGS. 6 through 8 is similar to the earlier-discussed arrangements in that the thrust plates 82,82 can independently slide in a tangential or radial direction transverse to shaft axis 15, thereby promoting a smooth sliding action of carrier sleeve 17d on shaft 11. The independent movement of each thrust plate is particularly advantageous in the case of a misaligned or skewed clutch release fork wherein the relative movement between the two fork fingers and the thrust plates will vary. The bearing 41d is floatably mounted on the carrier sleeve so that it can maintain a centered position relative to the clutch release levers 39 (FIG. 1).

In each of the herein illustrated embodiments of the present invention the carrier sleeve is slidably guided on the support shaft for noiseless wear-free motion in the axial direction. The thrust plate is floatably arranged on the carrier sleeve so that the carrier sleeve can move smoothly on the support shaft with little, if any, tendency to bind or wear prematurely. The anti-friction bearing is a separate self-aligning component with respect to the carrier sleeve so that the bearing assembly can achieve a centered position relative to the clutch release levers, with minimal distortional force input from the thrust plate or the carrier sleeve.

Obviously, numerous modifications and variations of the present invention are possible in the light of the above teachings. It is therefore to be understood that within the scope of the appended claims, the invention may be practiced otherwise than as specifically described herein.

What is claimed is:

1. A clutch release apparatus comprising a carrier sleeve slidable along a sleeve axis, an axially and radially movable thrust plate carried by said sleeve for engagement with a clutch actuator, a self-aligning anti-friction bearing assembly carried by said sleeve in axial alignment with said thrust plate for engagement with an array of clutch release levers, said thrust plate being axially and radially independently shiftable with respect to said sleeve and with respect to said bearing assembly, said sleeve having a surface spaced radially from said thrust plate so that said thrust plate can move transverse to the sleeve axis without exerting excessive force on said sleeve.

2. The apparatus of claim 1, wherein said sleeve has a groove formed therein, said thrust plate having a portion radially aligned with said groove, said bearing assembly comprising a non-rotating race member having a section thereof axially aligned with said groove, and said thrust plate and said non-rotating race member being capable of movement into said groove to relieve excessive forces applied to said thrust plate and said bearing assembly.

3. The apparatus of claim 2, wherein said thrust plate has two parallel radial surfaces, one of said radial surfaces being adapted to engage said clutch actuator, the other radial surface being engaged with said non-rotating race member.

4. The apparatus of claim 3, further comprising biasing means for axially biasing said thrust plate and said bearing assembly, and wherein said biasing means comprises an annular wave spring located within the groove in said sleeve to bias said thrust plate against said non-rotating race member.

5. The apparatus of claim 1, wherein said sleeve has a wall interposed between said thrust plate and said bearing assembly.

6. The apparatus of claim 1, wherein said sleeve has a wall interposed between said thrust plate and said bearing assembly, and further comprising a first annular wave spring biasing said thrust plate against said outwardly radiating wall, and a second annular wave spring biasing said bearing assembly against said outwardly radiating wall.

7. The apparatus of claim 1, wherein said bearing assembly comprises a non-rotating race member seated against said thrust plate and further comprising an annular wave spring disposed on said sleeve to bias said non-rotating race member against said thrust plate.

8. The apparatus of claim 1, wherein said bearing assembly comprises a non-rotating race member seated against said thrust plate and further comprising an annular wave spring disposed on said carrier sleeve to bias said thrust plate against said non-rotating race member.

9. The apparatus of claim 1, wherein said bearing assembly is mounted about said sleeve with a radial clearance relative to said outer surface of said sleeve so that said bearing assembly can shift its position in accordance with oppositely-acting forces imposed thereon by the thrust plate and the clutch release levers.

10. A clutch release assembly comprising a carrier sleeve slidable along a sleeve axis, a pair of thrust members carried by said sleeve for engaging a clutch actuator, an annular anti-friction bearing carried by said sleeve for engagement with an array of clutch release levers, each of said thrust members being movably mounted relative to the carrier sleeve, and wherein said thrust members and said bearing are independently shiftable relative to the carrier sleeve so that the thrust members and the bearing are shiftable relative to each other.

11. A clutch release assembly, comprising a carrier sleeve slidable along a sleeve axis, a thrust member carried by said sleeve for engagement with a clutch actuator, an anti-friction bearing assembly carried by said sleeve for engagement with an array of clutch release levers, and means for movably mounting said thrust member and said bearing assembly on said carrier sleeve such that said thrust member and said bearing assembly are independently shiftable relative to each other and relative to said carrier sleeve.

12. A clutch release apparatus comprising a carrier sleeve slidable along a sleeve axis, an axially and radially movable thrust plate carried by said sleeve for engagement with a clutch actuator, an anti-friction bearing assembly carried by said sleeve in axial alignment with said thrust plate for engagement with an array of clutch release levers, said sleeve having a surface spaced radially from said thrust plate so that said thrust plate can move transverse to the sleeve axis without exerting excessive force on said sleeve; wherein said sleeve has a groove formed therein, said thrust plate having a portion radially aligned with said groove, said bearing assembly comprising a non-rotating race member having a section thereof axially aligned with said groove, and said thrust plate and said non-rotating race member being capable of movement into said groove to relieve excessive forces applied to said thrust plate and said bearing assembly; wherein said thrust plate has two parallel radial surfaces, one of said radial surfaces being adapted to engage said clutch actuator, the other radial surface being engaged with said non-rotating race member; and further comprising biasing means for axially biasing said thrust plate and said bearing assembly, and wherein said biasing means comprises an annular wave spring located within the groove in said sleeve to bias said thrust plate against said non-rotating race member.

13. A clutch release apparatus comprising a carrier sleeve slidable along a sleeve axis, an axially and radially movable thrust plate carried by said sleeve for engagement with a clutch actuator, an anti-friction bearing assembly carried by said sleeve in axial alignment with said thrust plate for engagement with an array of clutch release levers, said sleeve having a surface spaced radially from said thrust plate so that said thrust plate can move transverse to the sleeve axis without exerting excessive force on said sleeve; wherein said sleeve has a wall interposed between said thrust plate and said bearing assembly, and further comprising a first annular wave spring biasing said thrust plate against said outwardly radiating wall, and a second annular wave spring biasing said bearing assembly against said outwardly radiating wall.

14. A clutch release apparatus comprising a carrier sleeve slidable along a sleeve axis, an axially and radially movable thrust plate carried by said sleeve for engagement with a clutch actuator, an anti-friction bearing assembly carried by said sleeve in axial alignment with said thrust plate for engagement with an array of clutch release levers, said sleeve having a surface spaced radially from said thrust plate so that said thrust plate can move transverse to the sleeve axis without exerting excessive force on said sleeve; wherein said bearing assembly comprises a non-rotating race member seated against said thrust plate and further comprising an annular wave spring carried by said sleeve to bias said non-rotating race member against said thrust plate.

15. A clutch release apparatus comprising a carrier sleeve slidable along a sleeve axis, an axially and radially movable thrust plate carried by said sleeve for engagement with a clutch actuator, an anti-friction bearing assembly carried by said sleeve in axial alignment with said thrust plate for engagement with an array of clutch release levers, said sleeve having a surface spaced radially from said thrust plate so that said thrust plate can move transverse to the sleeve axis without exerting excessive force on said sleeve; wherein said bearing assembly comprises a non-rotating race member seated against said thrust plate and further comprising an annular wave spring carried by said carrier sleeve to bias said thrust plate against said non-rotating race member.

16. A clutch release assembly comprising a carrier sleeve slidable along a sleeve axis, a pair of thrust members carried by said sleeve for engaging a clutch actuator, an annular anti-friction bearing carried by said sleeve for engagement with an array of clutch release levers, each of said thrust members being movably mounted relative to the carrier sleeve; and an axially-acting biasing means for biasing said bearing toward said thrust members, and wherein said biasing means comprises an annular wave spring.

17. A clutch release assembly comprising a carrier sleeve slidable along a sleeve axis, a pair of thrust members carried by said sleeve for engaging a clutch actuator, an annular anti-friction bearing carried by said sleeve for engagement with an array of clutch release levers, each of said thrust members being movably mounted relative to the carrier sleeve; and wherein each of said thrust members comprises an L-shaped plate, each plate having a first plate portion extending transverse to the sleeve axis, and a second plate portion extending parallel to the sleeve axis.

18. The assembly of claim 17, and further comprising parallel guides carried on the sleeve for overlapping engagement with edge areas of each said second plate portion, whereby each L-shaped plate is loosely retained on the sleeve.

19. The assembly of claim 18, wherein the internal spacing between opposed ones of the parallel guides is greater than the spacing across the edge areas of the associated second plate portions, whereby each L-shaped plate is capable of shifting in a direction normal to the L-shaped plate profile.

* * * * *